Sept. 30, 1969  D. ROGERS  3,469,299
INTERIOR LINE-UP CLAMP
Filed Dec. 29, 1966  2 Sheets-Sheet 1

Dick Rogers
INVENTOR

BY James F. Weiler
Paul L. DeVerter II
Dudley R. Dobie, Jr.
Henry W. Hope

ATTORNEYS

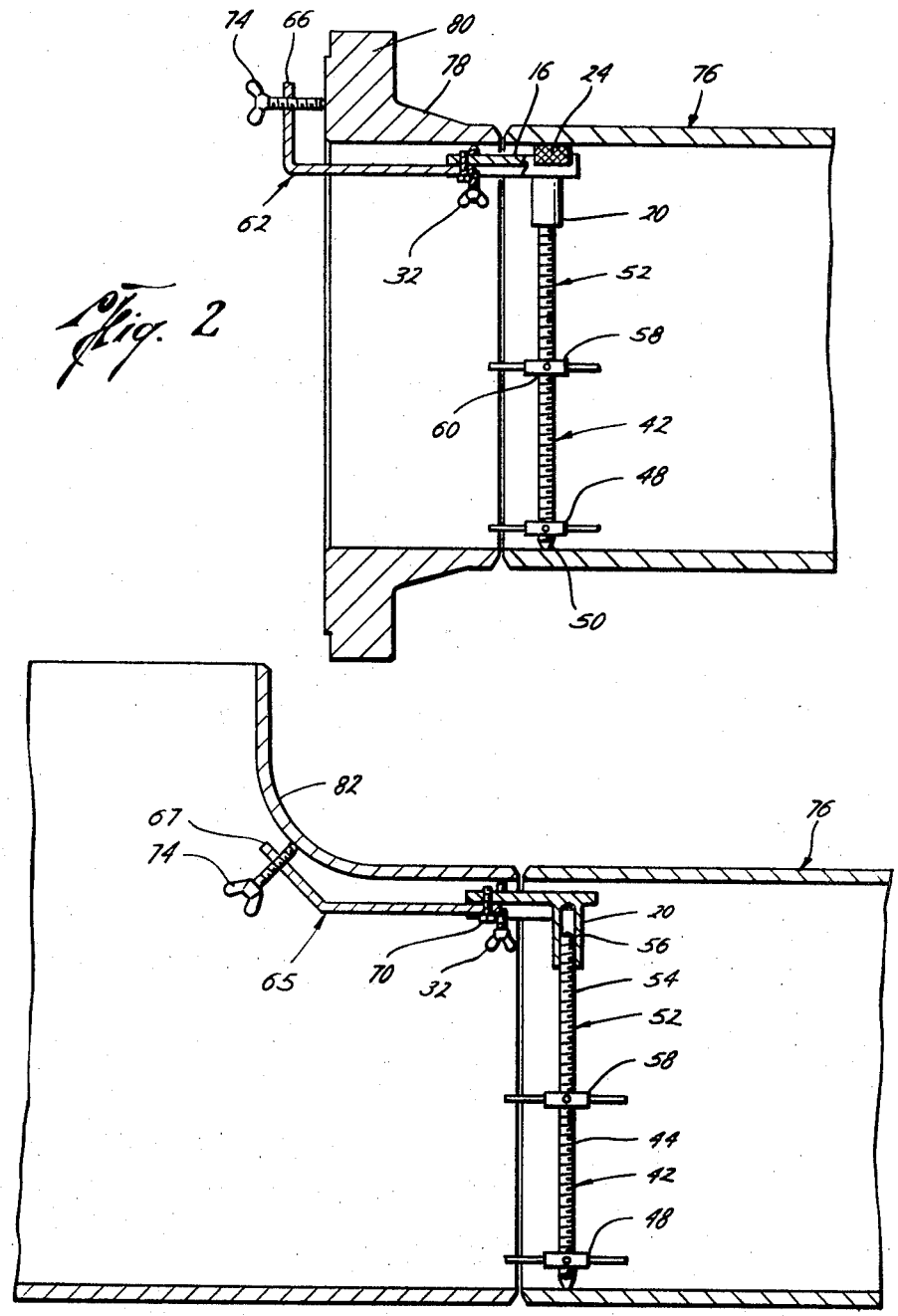

United States Patent Office 3,469,299
Patented Sept. 30, 1969

3,469,299
INTERIOR LINE-UP CLAMP
Dick Rogers, Magnolia, Ark., assignor of fifty percent to Dwight W. Isaacks, Houston, Tex.
Filed Dec. 29, 1966, Ser. No. 605,804
Int. Cl. B23k 37/04; B23q 3/00
U.S. Cl. 29—200                    2 Claims

ABSTRACT OF THE DISCLOSURE

Generally, the present invention relates to a clamp to be used to properly position and support, or in some cases to aid in the positioning and support of, pipe fittings while they are being welded to pipes. The clamp is mounted on the inside of the pipe and a portion of the clamp extends out of the pipe for the support and positioning of the fittings.

---

Figure 1:
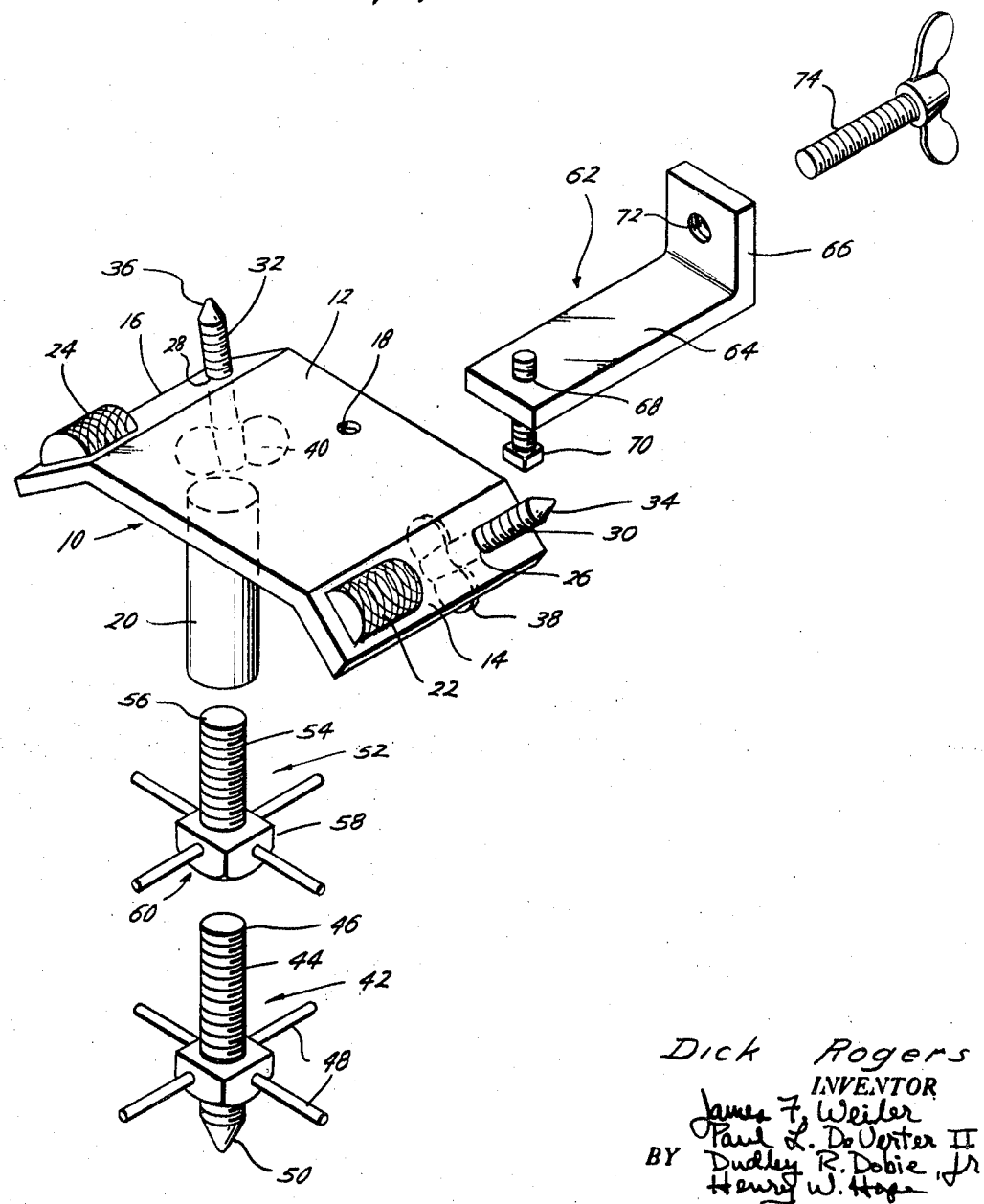

The present invention relates to clamps and more particularly to line-up clamps for positioning and supporting pipe fittings while they are being welded to pipes.

Pipe fittings, such as weld neck flanges, T's 90° angles and the like, must be properly positioned and supported to be properly welded onto the pipe. This positioning of the fitting is especially important with today's demanding construction standards. For example, the welds connecting the fittings to the pipe are subjected to X-ray examination to determine if proper spacing has been utilized and if the weld is complete in the space between the pipe and the fitting.

A common method of positioning and supporting the pipe fitting is to have an assistant hold the fitting in place while the pipe welder welds it to the pipe. This was not altogether satisfactory due to the fact that it required two men and, due to the heaviness of the fittings, the person holding the fitting had a difficult time maintaining it in its proper position. By way of example, the weight of a standard 6 inch weld neck flange is 29 pounds; 12 inch, 80 pounds; and 24 inch, 260 pounds. On any fitting, therefore, it is difficult to keep it properly positioned for any length of time and on the larger ones, it is impossible for one man to perform this task.

To overcome this, various devices were employed to aid in supporting the fittings. Various benches and similar supports were used to provide support from beneath the fittings. These had the disadvantages, however, of interfering with the welding operation, not providing satisfactory support for different shapes and sizes of fittings and having inadequate fine adjustment means for aligning the fitting with the pipe. To overcome the above disadvantages would require a more elaborate device than was justified.

Line-up clamps which are attached onto the outside of the pipe were and are also used. These, however, suffer from the disadvantage of interfering with the pipe fitter while welding the fitting onto the pipe. They are also relatively more complex and expensive.

The present invention seeks to overcome the above disadvantages by the utilization of a line-up clamp which attaches to the interior of the pipe to which the fitting is being welded. The device is simple in construction and operation, as well as being economical to manufacture.

The present invention utilizes a plate having an extension member extending outwardly from one side of the plate. This extension member is in threaded engagement with the plate so that it may be screwed in or out. On the opposite side of the plate are knurled or roughened surfaces. The extension member and the roughened surfaces cooperate to act against the inner sidewalls of the pipe to hold the clamp upright. A portion of the plate extends out of the pipe to support the pipe fitting. Screws are attached to this plate portion to raise or lower the fitting. The friction created by the coaction of the extension member and roughened surfaces is sufficient to hold the fitting which rests on the screws.

It is, therefore, an object of the present invention to provide a line-up clamp to aid in the support and positioning of pipe fittings, whereby they may be welded onto pipe.

Another object is to provide a small and lightweight clamp which may be used in a portable manner.

It is a further object of the present invention to provide a line-up clamp which is simple in operation, economical to produce and which performs on pipe of various sizes in a reliable manner.

A still further object of the present invention is to provide a line-up clamp for attachment in the interior of the pipe, whereby there will be no interference with the welding operation.

A still further object of the present invention is to provide an interior line-up clamp having a portion which extends out of the end of the pipe within which the clamp is attached for the support of the pipe fitting, this portion containing screws upon which the fitting rests for relatively fine adjustment of the pipe fitting.

An additional object of the present invention is to provide an interior line-up clamp having an elongated bracket to contact the outer surface of the pipe fitting to urge the fitting against the pipe, thereby giving additional aid in the support and positioning of the fitting.

Other and further objects, features and advantages will be apparent from the following description of a presently preferred embodiment of the invention given for the purpose of disclosure, taken in conjunction with the accompanying drawings, where like character references designate like parts throughout the several views and where:

FIGURE 1 is an exploded perspective view of preferred embodiment of the present invention, FIGURE 2 is a side view of the embodiment of FIGURE 1 attached to the interior of a pipe and supporting a flange in a position to be welded, the pipe and flange being in section for purposes of illustration, and FIGURE 3 is a side view of the present invention which is attached to the inside of a pipe and positioning a T, the pipe and T being in section for purpose of illustration.

Referring now to FIGURE 1, the present invention is generally comprised of a central plate generally indicated by the numeral 10. The plate 10 has a central portion 12 which is a substantially flat plate. On either side of the central portion 12 are depending flanges 14 and 16 which are inclined downwardly from portion 12, whereby the angle between the upper surfaces of the flanges and the upper surface of the portion 12 is an obtuse angle. These flanges are connected to the central portion 12 either by welding or by any other convenient means. The flanges 14 and 16 may, of course, be made integral with the central portion 12. At one end of the portion 12 is a threaded opening 18 which extends through the plate. Located near the opposite end of the central portion 12 is sleeve 20 which depends from the lower surface (as seen in FIGURE 1) of the plate 10.

Turning now to the flanges 14 and 16, each flange has located thereon raised, roughened and curved surfaces 22 and 24, respectively. These curved surfaces are connected to the upper surfaces or faces of the flanges 14 and 16 by any conventional means, such as welding. The roughened surfaces 22 and 24 are located near the same end of the plate 10 as is the sleeve 20 although on the opposite surface of the plate 10. Located near the ends of the flanges 14 and 16 opposite the roughened surfaces are threaded openings 26 and 28. Thumb screws 30 and 32 are threaded within the openings 26 and 28, respectively. When assembled, the pointed ends 34 and 36 of the thumb screws 30 and 32 extend above the upper surface, as seen in FIGURE 1, of the plate 10 and the gripping portions 38 and 40 are beneath the plate 10. Due to the inclination of the flanges, the screws 30 and 32 extend upwardly at divergent angles.

An extension member, generally indicated at 42, is comprised of an elongate rod 44 which is only partially shown in FIGURE 1. The elongate rod 44 is threaded for engagement by the end 46 within the socket or sleeve 20. Located at the end of the elongate rod 44 opposite from the end 46 is a handle or gripping portion 48. This opposite end terminates in a point 50.

A second extension member 52 is also shown in FIGURE 1 and is comprised generally of an elongate threaded rod 54, whereby the end 56 may be threadedly engaged within the socket 20. Located on the opposite of the elongate rod 54 is gripping portion 58. A socket 60 is located under the gripping portion 58, the socket being threaded for an engagement with the end 46 of the extension member 42. As can be seen in FIGURE 2, the extension member 52 may be used to connect the extension member 42 to the sleeve 20 by insertion of the end 46 in the socket 60 to enable the line-up clamp to be used in pipe of large diameter.

Additional support and clamping apparatus is found in the present invention in the use of the bracket generally indicated by the numeral 62. This L-shaped bracket 62 may be formed as an integral piece. A threaded opening 68 is located on the leg 64 and coacts with the bolt 70 and the opening 18 in the plate 10 to releasably attach the L-shaped bracket onto the plate. The upstanding flange 66 has an opening 72 extending therethrough for threaded engagement with the thumb screw 74.

Turning now to FIGURES 1, 2 and 3, the operation of the present device will be described. The workman first determines whether or not the pipe 76 is of such a diameter as to require the use of the second extension member 52. In the example shown in FIGURE 2, such is the case. The end 56 is then screwed into the sleeve 20 and the first extension member 42 is attached to the socket 60. The extension members 42 and 52 are screwed into socket 60 and sleeve 20, respectively, a distance sufficient to make the overall height of the device less than the inside diameter of the pipe 76 so as to permit the insertion of the clamp into the pipe 76. The clamp is positioned essentially vertically and the extension members 42 and 52 are rotated so as to lengthen the distance between the upper surface of plate 10 and point 50. As can be seen, this will bring about the contact of the point 50 and the roughened surfaces 22 and 24 with the pipe 76. The point 50 will dig into the pipe 76, as will the roughened surfaces 22 and 24. This will aid in maintaining the clamp in its upright position when the pipe fitting is being supported. Increased rotation of the gripping portions 48 and 58 will bring about an increase in the length of the extension members, thus creating an even stronger contact with the pipe.

After the clamp is securely and properly positioned within the pipe, a portion of the plate 10 extends therefrom as can be seen in FIGURE 2. This portion contains the screws 30 and 32. It is upon this portion of the plate 10, and in particular upon the points 34 and 36 of the screws 30 and 32 that the pipe fitting rests while it is being welded upon the pipe. By turning either or both of the screws 30 and 32, the position of the fitting may be adjusted relative to the pipe 76. In this manner the fitting may be raised or lowered or even moved laterally a certain extent. The lateral movement is brought about due to the alignment of the screws at a divergent angle to each other. Rotation of screw 30, for example, will not only raise the fitting, but will also shift the center of the fitting to one side. Rotation of screw 32 will bring about the movement to the opposite side. Accordingly, should the clamp not be aligned in an exactly vertical position, this may be compensated for by the proper use of the supporting screws 30 and 32.

Additional stabilizing means may be employed by the utilization of the L-shaped clamp 62. Prior to the installation of the clamp in the interior of the pipe, the L-shaped bracket is attached to the plate 10 by the bolt 70. The pipe fitting 78 is then placed on the support members or screws 30 and 32 and the thumb screw 74 is tightened onto the outer surface 80 of the fitting. As can be seen in FIGURE 2, the action of the supporting screws 30 and 32 with the action of the screw 74 combine to provide adjustability as well as a relatively stable support for the fitting 78.

The use of the bracket 62 is, of course, not necessary. The use of the clamp in this manner on pipe fittings of particular configurations, for example, T's, would require an assist by the fitter in maintaining the fitting in the proper position due to the fact that the fitting would not be evenly balanced. The majority of the weight of the fitting, however, would be borne by the clamp and the welder may hold the fitting in the desired position with one hand while he tacks it onto the pipe.

Variations may, of course, be used in the bracket 62 as with other parts of the device. For example, the leg 64 or the leg 66 may be lengthened or shortened to conform to fittings of various sizes. In the situation shown in FIGURE 3, the bracket 65 has an angularly disposed leg 67, whereby the T is supported entirely by the clamp and without the aid of the fitter. Other variations that readily come to mind are: extensions of additional legs 66 at different angles for support of the fitting at other points; modification of the plate or support member 12 so that the support screws or elements 30 and 32 extend at angles other than as shown in the drawing (for example at 180° to each other); and the addition of more such support elements.

As can be seen therefrom, the present invention has achieved the objectives set forth at the outset. A simple device has been provided which allows ease of operation as well as construction. The device is relatively small and light, thus allowing it to be carried in the workman's toolbox and may be quickly assembled on the site. The clamp is used on the interior of pipes and supports and fittings from within the fittings themselves, whereby there is no interference in the welding operation. The adjustments provided by the use of the first and second extension members 42 and 52 make the line-up clamp adaptable for use in pipes of varying diameters. This is further implemented by the use of the curved, roughened surfaces 22 and 24 which, by their curved configuration, provide a gripping or friction surface which will contact the interior of the pipe regardless of its diameter.

The clamp may be used to support a wide variety of pipe fittings with only minor adjustments which may be quickly performed. Adjustment for the proper positioning of the pipe fitting is provided by the divergent support screws 30 and 32 as well as by the use of the elongate bracket and screw extending outwardly from the plate. A clamp has been achieved which either completely supports the pipe fitting in the proper position for welding purposes or else supports the major portion of the weight of the pipe fitting, whereby the welding operation requires only one workman.

The present invention, therefore, is well suited for and adapted to attain the objects and the ends mentioned as well as those inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. An interior line-up clamp for positioning pipe fittings for attachment to the end of pipes, including, a plate having a first and second end, and upper and lower faces, said plate comprised of
a main portion,
side flanges fixedly attached to opposed sides of the main portion, the upper faces of the side flanges being at equal, obtuse angles to the upper face of the main plate,
a sleeve extending downwardly from the lower face of the main portion and near the first end of said plate,
an elongate extension member threadedly connected by one end to the sleeve, whereby the distance from the plate to the second end of the extension member may be varied by rotation of said extension member within said sleeve, the second end terminating in a point,
a raised, curved, roughened surface on the upper surface of each of the side flanges near said one end of said plate, and
support screws having pointed ends for supporting the pipe fitting and being threadedly connected to the side flanges, the pointed ends of said support screws extending upwardly from the upper surfaces of the side flanges at angles divergent to each other.

2. The invention of claim 1 and further including,
an elongate bracket, one end of which is releasably secured to the main portion, the bracket extending outwardly from the second end of said plate,
an upstanding flange at the outermost end of said bracket,
a screw extending through and in threaded engagement with the upstanding flange, said screw and upstanding flange being so constructed and arranged that the screw acts against the pipe fitting resting on said support screws to urge the pipe fitting away from said flange.

References Cited

UNITED STATES PATENTS

| | | |
|---|---|---|
| 2,396,452 | 3/1946 | Widmark et al. |
| 2,525,680 | 10/1950 | Ingemarson _____ 269—52 X |
| 2,615,413 | 10/1952 | Adams et al. _____ 269—52 X |
| 3,121,280 | 2/1964 | McFadden. |
| 3,259,964 | 7/1966 | Engel _____ 228—4 |
| 3,330,021 | 7/1967 | Jacobsen. |

THOMAS H. EAGER, Primary Examiner

U.S. Cl. X.R.

228—4; 269—52